United States Patent [19]

Yoshida

[11] 4,367,537

[45] Jan. 4, 1983

[54] ADDRESS RETRIEVAL IN AN ELECTRONIC DICTIONARY AND LANGUAGE INTERPRETER

[75] Inventor: Kunio Yoshida, Tsuge, Japan

[73] Assignee: Sharp Kabushiki Kaisha, Osaka, Japan

[21] Appl. No.: 104,957

[22] Filed: Dec. 18, 1979

[30] Foreign Application Priority Data

Dec. 19, 1978 [JP] Japan .............................. 53/165456

[51] Int. Cl.³ ........................................... G06F 15/38
[52] U.S. Cl. ..................................................... 364/900
[58] Field of Search ... 364/200 MS File, 900 MS File

[56] References Cited

U.S. PATENT DOCUMENTS 4,158,236  6/1979  Levy ..................................... 364/900
4,159,536  6/1979  Kehoe et al. ......................... 364/900

Primary Examiner—Raulfe B. Zache
Attorney, Agent, or Firm—Birch, Stewart, Kolasch & Birch

[57] ABSTRACT

A word information retrieval system in an electronic dictionary and language interpreter comprises an address controller for developing an initial address code number associated with character information designating at least a leading character of a desired word entered by an input device. An address counter is responsive to the address controller for addressing a memory circuit according to the initial address code number. The memory circuit contains a great number of bits of code information representing translated words equivalent to the entered word. A comparison circuit is provided for determining the equivalency between the entered word and one of the translated words obtained from the memory circuit. The address counter is further responsive to the comparison circuit for addressing the memory circuit according to an increased address code number obtained by the addition successive increments to the initial address code number until an address code number is achieved which corresponds to that of the full word in the memory circuit.

9 Claims, 3 Drawing Figures

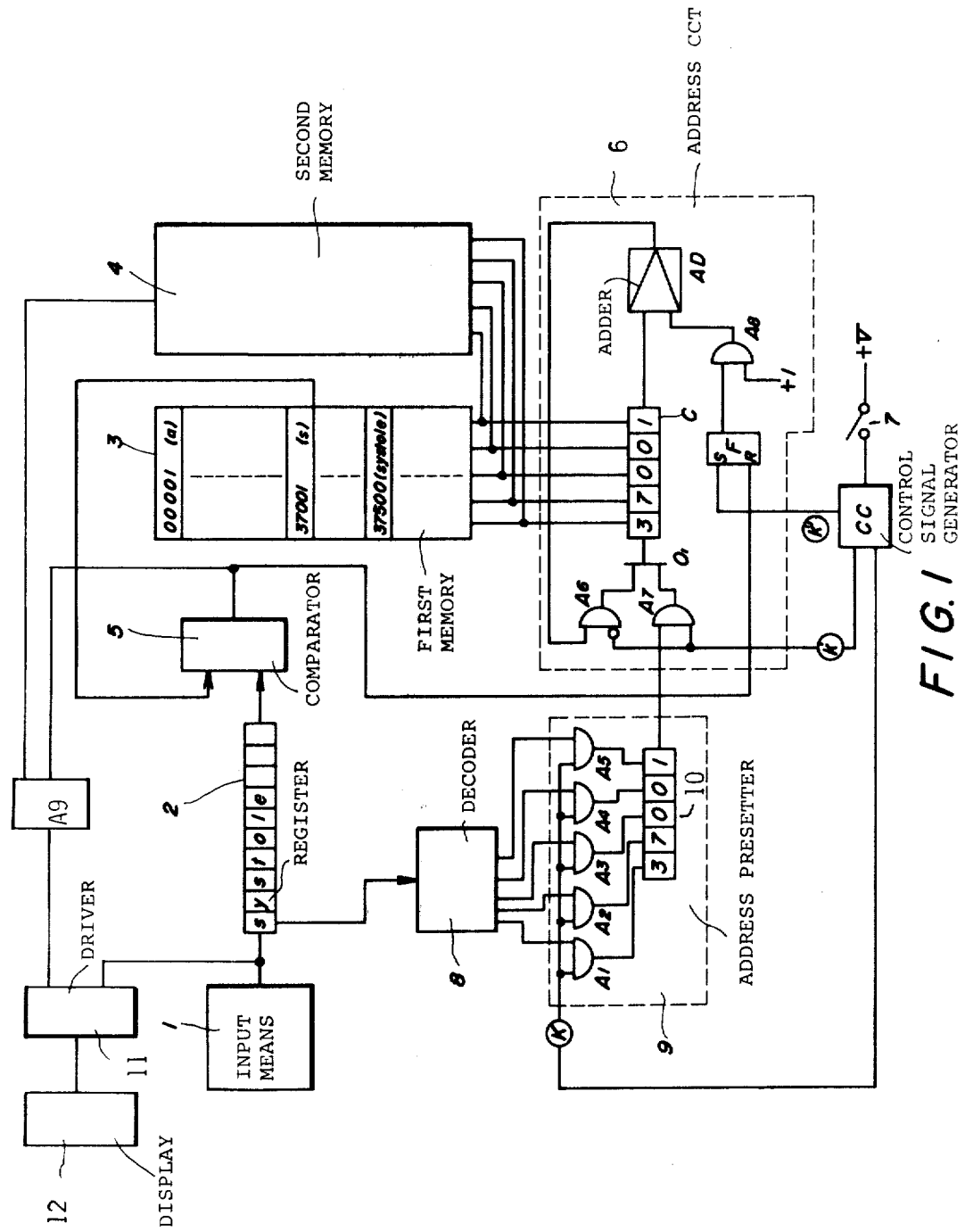
FIG. I

| Index | Leading Address |
|---|---|
| a | 0 |
| b | 510 |
| c | 2530 |
| d | 3211 |
| ⋮ | ⋮ |
| z | 49072 |

*FIG.2(A)*

| Index | | Leading Address |
|---|---|---|
| a | a | 0 |
| a | b | 125 |
| a | c | 154 |
| a | d | 197 |
| ⋮ | ⋮ | ⋮ |
| a | z | 426 |
| b | a | 510 |
| ⋮ | ⋮ | ⋮ |
| b | e | 631 |
| ⋮ | ⋮ | ⋮ |
| b | z | 2521 |
| c | a | 2530 |
| c | b | 2764 |
| ⋮ | ⋮ | ⋮ |
| c | z | 3209 |
| d | a | 3211 |
| ⋮ | ⋮ | ⋮ |
| z | z | 50000 |

*FIG.2(B)*

ADDRESS RETRIEVAL IN AN ELECTRONIC DICTIONARY AND LANGUAGE INTERPRETER

BACKGROUND OF THE INVENTION

The present invention generally relates to a word information storage device, and more particularly to an improvement in address retrieval in reading out a specified word in an electronic dictionary and language interpreter for providing efficient and rapid retrieval of word information stored in the memory thereof.

Recently, electronic devices called electronic dictionaries and language interpreters have become available on the market. The electronic dictionaries and language interpreters require efficient and rapid retrieval of word information stored in a memory. An example of such electronic dictionaries and language interpreters is disclosed in Levy U.S. Pat. No. 4,158,236, June 12, 1979, "ELECTRONIC DICTIONARY AND LANGUAGE INTERPRETER".

OBJECTS AND SUMMARY OF THE INVENTION

Accordingly, it is the primary object of the present invention to provide an improved retrieval system incorporated within an electronic dictionary and language interpreter.

It is a further object of the present invention to provide an improved retrieval system activated to promptly search and take out addresses wherein specified word information is stored in a memory, of an electronic dictionary and language interpreter.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a word information retrieval system in an electronic dictionary and language interpreter is provided which comprises an address controller for developing an initial address code associated with character information designating at least a leading character of a desired word entered by an input device. An address counter is responsive to the address controller for addressing a memory circuit according to the initial address code.

The memory circuit contains a great number of bits of code information representing words equivalent to the entered word. A comparison circuit is provided for determining the equivalency between the entered word and one of the translated words obtained from the memory circuit. The address counter is further responsive to the comparison circuit for addressing the memory circuit according to an increased address code number obtained by the addition of a desired number to the initial address code.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 1 is a block diagram of a control circuit incorporated into an electronic dictionary and language interpreter according to the present invention; and FIGS. 2(A) and 2(B) are tables showing the relationship between one or two index characters and the number of respective leading addresses, the relationship being available in the control circuit shown in FIG. 1.

DESCRIPTION OF THE INVENTION

With reference to FIG. 1, a control circuit of an electronic dictionary and language interpreter of the present invention comprises an input means 1, a register 2, a first memory 3, a second memory 4, a comparator 5, an address circuit 6, a retrieval start switch 7, a decoder 8, an address pre-setter 9, a control signal generator cc, an AND gate $A_9$, a driver 11, and a display 12.

The input means 1 is actuated to enter first word information in order to search and obtain second word information equivalent to the first word information. Preferably, the input means 1 comprises an alphabetical keyboard or any other type of character keyboards available in entering words in a desired language. The register 2 is responsive to the input means 1 to temporarily store the first word information entered by the input means 1. The first memory 3 contains preliminarily a great number of first words in a first language in the form of code information. For convenience of description, it is assumed that each of the first words stored in the first memory 3 is designated in terms of address identifying numbers in the first memory 3 wherein each of the first words is stored. Each of the first words is specified by the input means 1. The second memory 4 contains a great number of translated words in a second language equivalent to the respective first words contained within the first memory 3. Both of the first memory 3 and the second memory 4 may be comprised of a read only memory (ROM). Both of the first memory 3 and the second memory 4 are addressed by means of the same address circuit 6 such that output signals from both of them designate relevant information, in particular, a special word in the first language and its translated or equivalent word in the second language.

The comparator 5 functions to determine the equivalency between the contents in the register 2 and the output signals from the first memory 3. The address circuit 6 is responsive to the control signal generator CC to address the first memory 3 and the second memory 4. The address circuit 6 comprises an address counter C, three AND gates $A_6$, $A_7$ and $A_8$, a flip flop F, an adder AD, and an OR gate $O_1$. The address counter C contains in succession address codes, each useful in addressing the first memory 3 and the second memory 4. The address circuit 6 becomes inoperative by output signals from the comparator 5 indicating that the retrieval of the contents in the first memory 3 with respect to the contents of the register 2 has been completed.

The control signal generator CC develops three kinds of control signals, $(k)$, $(k')$, and $(k'')$ in response to the actuation of the retrieval start switch 7 in order to carry out the retrieval of the contents of the first memory 3 and the second memory 4 in connection with the contents of the register 2. The decoder 8 is interposed between the register 2 and the address presetter 9 to decode desired character information of the contents of the register 2 and generate an address code corresponding thereto. According to a preferred embodiment of the present invention, the decoder 8 is provided for decoding character information representing the leading character of the entered word stored in the register 2 and for developing the address code related thereto.

The address codes developed from the decoder 8 are applied to the address presetter 9. The address presetter 9 comprises five AND gates $A_1$ to $A_5$ and a register circuit 10. The control signals $(k)$ are applied respectively to the AND gates $A_1$ to $A_5$ to allow them in the presence of signals from the decoder 8 to transfer the address code to the register circuit 10. The address code is thus applied to and temporarily stored in the register circuit 10.

In operation, the input means 1 is actuated to enter a desired word, such as, "SYSTOLE". The word "SYSTOLE" is stored in the register 2. The decoder 8 receives character information of the leading character "S" of the word "SYSTOLE". The character information of the leading letter "S" is decoded by the decoder 8 and entered into the address presetter 9. The decoder 8 may be comprised of a desired number of decoder circuits, such as, 26, covering all the alphabets from "A" to "Z". The character information designating the leading letter "S" is changed to an address code by means of the decoder 8.

The address code is transferred from the decoder 8 to the AND gates $A_1$ to $A_5$ in response to the control signals $(k)$ generated from the control signal generator CC. The control signals $(k)$ are generated in response to the actuation of the retrieval start switch 7. The control signals $(k)$ allow the AND gates $A_1$ to $A_5$ to be conductive.

It is assumed that the character information corresponding to the leading character "S" of the word "SYSTOLE" is designated in terms of the address code "37001". The address code "37001" is thus stored in the register circuit 10. The second control signals $(k')$ are developed from the control signal generator CC. The AND gate $A_7$ becomes conductive in response to the introduction of the second control signals $(k')$, in which case the address code "37001" is transferred from the register circuit 10 to the address counter C contained within the address circuit 6 through the AND gate $A_7$ and the OR gate $O_1$. Then the flip flop F is set in response to the third control signals $(k'')$ developed from the control signal generator CC.

Under the circumstances, the first memory 3 and the second memory 4 are both addressed according to the address code "37001" stored in the address counter C. In this instance, it is assumed that the character "S" is stored in the address "37001" of the first memory 3 and a number of words starting at the character "S" are stored in the following addresses of the same. At first, the address "37001" of the first memory 3 is accessed according to the address code "37001" contained within the address counter C.

Therefore, the code information stored in the address "37001" representing the character "S" is applied to the comparator 5 while, on the other hand, the comparator 5 has a train of the character information stored in the register 2 representing the entered word "SYSTOLE". Since the equivalency is not established between the code information of the character "S" and the entire train of the character information indicating the entered word "SYSTOLE", there are no output signals from the comparator 5. In such a case, a one is applied to the AND gate $A_8$ so that the AND gate $A_8$ becomes conductive. The adder AD is coupled to the AND gate $A_8$ and the address counter C so that the adder AD adds one to the address code "37001" stored in the address counter C. The results "37002" of addition developed from the adder AD are applied to the address counter C through the conductance of both the AND gate $A_6$ and the OR gate $O_1$. Then the old address code "37001" is replaced by the fresh address code "37002" which should be now stored in the address counter C.

Thereafter, the following address "37002" of the first memory 3 is given access according to the address code "37002" contained in the address counter C. The code information stored in the address "37002" of the first memory 3 is applied to the comparator 5 together with the train of the character information applied from the register 2. The comparator 5 is operated to determine the equivalency between them. However, the equivalency between them is again not obtained.

Hence further signals indicating ones are applied to the AND gate $A_8$. The adder AD functions to add one to the address code "37002" now stored in address counter C. The added results "37003" is entered into and stored in address counter C through the AND gate $A_6$ and the OR gate $O_1$. The first memory 3 is addressed according to the further address code "37003" since then.

Similar access operation is repeated till the code information representative of the word "SYSTOLE" is developed from the first memory 3, in which case the address code stored in the address counter C is "37500" for the purpose of causing the access of the first memory 3. Regarding the address "37500" in the first memory 3, the equivalency is established between the code information of the address "37500" and the train of the character information of the entered word "SYSTOLE", the equivalency being determined by the comparator 5. The comparator 5 generates output signals indicating the occurrence of the equivalency. The output signals developed from the comparator 5 are applied to the flip flop F so as to reset the flip flop F, in which case the AND gate $A_8$ is prevented from becoming conductive any more. That is, the address code "37500" stored in the address counter C is not increased. In such a case the access operation of the first memory 3 is completed. The second memory 4 is addressed by the address counter C in synchronization with the first memory 3. When the first memory 3 provides the code information of the address "37500" representing the entered word "SYSTOLE", it is supposed that the second memory 4 generates the code information indicating a translated word corresponding to the entered word "SYSTOLE". The AND gate $A_9$ has the code information developed from the second memory 4 according to the address code "37500" and the output signals from the comparator 5 indicating the occurrence of the equivalency between the code information from the first memory 3 and the train of the character information from the register 2. Hence the AND gate $A_9$ provides the code information from the second memory 4 as its output signals. The driver 11 receives the code information from the second memory 4 and the word entered by the input means 1 for displaying purposes. The display 12 is coupled to the driver 11 so that it indicates the translated word obtained from the second memory 4 and the entered word "SYSTOLE".

FIG. 2(A) shows a table indicating a relationship between a single index character representing one of the alphabets and its related leading address of the first memory 3 where one of the alphabets is stored. The table shown in FIG. 2(A) is referred to the preferred embodiment described in conjunction with FIG. 1, wherein the address presetter 9 is adapted to store and select a specified address code designating a single character positioned at the head of the entered word.

According to the preferred embodiment described in FIG. 1, it is unnecessary to cause access of the code information representing words starting with letters "A" to "R" positioned prior to the alphabet "S" from the first memory 3. Therefore, a period of time required to obtain the code information equivalent to the entered word is considerably shortened.

To further shorten the period of time needed to take out the code information equal to the entered word, the address presetter 9 is further adapted to contain and select a desired address code representing the first and second characters positioned from the head or beginning of the entered word. FIG. 2(B) shows another table indicating a relationship between two index characters each indicative of one of all the combinations produced by all the letters "A" to "Z" and its related leading address of the first memory 3 where each of the two index characters is contained.

In such a case, the decoder 8 should be modified so as to generate a leading address in connection with both the first character and the second character of the entered word. The table shown in FIG. 2(B) should contain the leading addresses in an amount of 702 (=27×26) to cover all the combinations. Some of the leading addresses can be omitted because they correspond to a small amount of words.

For example, some combinations of the first and the second characters, aa, ah, aj, ak and ao have only a small number of the words. The same leading address is available in connection with each of the groups of the combinations (aa, ab), (ah, ai), (aj, ak, al), and (ao, ap). Some combinations of the first and the second characters, bd, bf and the like have no meaning because they do not lead to any actual words. Such combinations and the leading addresses can be omitted.

Although not shown in FIG. 2(B), the leading address covering single letters "A" to "Z" should also be presented for convenience.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A word translation or dictionary device comprising:

input means actuated to enter character information representative of a desired word in a first language;

decoder means responsive to the input means for developing an initial address code corresponding to character information designating at least a leading character of the word entered by the input means;

first memory means containing a plurality of words in said language stored in a plurality of separate groups, the words in each of said groups having the leading same character and being stored in coded locations correlated to said address code of said leading character;

second memory means containing address code information representing the location of a translated word in a second language equivalent to the desired word stored in the first memory means;

address means provided for synchronously addressing the first memory means and the second memory means so that the desired word is retrieved from the first memory means together with the retrieval of the translated word generated from the second memory means;

comparison means responsive to the input means and words retrieved by said address means from the first memory means for determining equivalency between the word entered by the input means and the word retrieved from the first memory means;

said address means being responsive to the decoder means for directly accessing a selected one of said separate groups stored in the first memory means defined by the leading character address code thereof and responsive to comparison results determined by the comparison means for causing further access of code information related to the specific location of said desired word in said group until said equivalency is obtained; and display means responsive to said equivalency determined by the comparision means for indicating the translated word designated by the code information generated from the second memory means.

2. The device according to claim 1, wherein the decoder means includes means to develop the single initial address code equivalent to the character information representing the first character and the second character of the word entered by the input means, each of said groups containing subgroups, the words in each of said subgroups having the same first and second characters.

3. The device according to claims 1 or 2, wherein the address means comprises an address counter for causing access of the code information stored in the first and the second memory means according to the contents therein, and an adder circuit actuated during said further access in response to comparison results, for adding one to the contents stored in the address counter, said address codes for the words in each of said groups being consecutive numbers separated in value by said one.

4. The device according to claim 1 or 2, which further comprises a retrieval start switch actuated for indicating a retrieval operation of the code information contained within the first and the second memory means, and a control signal generator responsive to the actuation of the retrieval start switch for providing control signals applied to the decoder means and the address means.

5. The device according to claim 4, further comprising: a storage circuit for storing the initial address code developed by said decoder means in response to the introduction of the control signals developed from the control signal generator.

6. The device according to claim 4, wherein the address means comprises an address counter for causing access of the code information stored in the first and the second memory means according to the contents therein, and an adder circuit responsive to the introduction of the control signals developed from the control signal generator for adding one to the contents stored in the address counter, said address codes for the words in each of said groups being consecutive numbers separated in value by said one.

7. The device according to claim 6, wherein the address means further comprises an AND gate means coupled to the control signal generator and the address counter for starting to cause access of the code information defined by the initial address code in response to the introduction of the control signals generated from the control signal generator.

8. The device according to claim 6, wherein the address means further comprises a flip flop circuit connected to the control signal generator for starting to operate in response to the introduction of the control signals, an AND gate means connected to the flip flop circuit and means for generating signals indicating said one.

9. The device according to claim 1, wherein the same leading characters in the words in each of said groups are alphabetic letters.

* * * * *